United States Patent
Shidara

(10) Patent No.: US 7,233,552 B2
(45) Date of Patent: Jun. 19, 2007

(54) OPTICAL DISK DEVICE CAPABLE OF RECORDING INFORMATION DATA ACCORDING TO ZCLV FORMAT

(75) Inventor: Kiyoshi Shidara, Kawagoe (JP)

(73) Assignee: TEAC Corporation, Musashino-shi (JP)

( * ) Notice: Subject to any disclaimer, the term of this patent is extended or adjusted under 35 U.S.C. 154(b) by 547 days.

(21) Appl. No.: 10/193,964

(22) Filed: Jul. 11, 2002

(65) Prior Publication Data

US 2003/0026180 A1 Feb. 6, 2003

(30) Foreign Application Priority Data

Jul. 12, 2001 (JP) ............................. 2001-212722

(51) Int. Cl.
G11B 5/09 (2006.01)
(52) U.S. Cl. ................................. 369/47.3; 369/47.43
(58) Field of Classification Search ............... 369/47.3, 369/53.45, 47.43, 47.23, 47.24, 47.29, 47.38, 369/53.3, 53.43, 59.25
See application file for complete search history.

(56) References Cited

U.S. PATENT DOCUMENTS

| | | | |
|---|---|---|---|
| 5,412,629 A | | 5/1995 | Shirane |
| 5,473,584 A | * | 12/1995 | Oshima ................... 369/47.11 |
| 5,535,186 A | * | 7/1996 | Ishizawa .................... 369/47.3 |
| 5,805,548 A | * | 9/1998 | Ishihara et al. .......... 369/47.43 |
| 5,877,623 A | * | 3/1999 | Min .......................... 369/239 |
| 6,026,068 A | * | 2/2000 | Obata et al. ................ 369/53.2 |
| 6,028,828 A | * | 2/2000 | Maeda ....................... 369/47.4 |
| 6,052,347 A | * | 4/2000 | Miyata .................... 369/47.53 |
| 6,339,571 B1 | * | 1/2002 | Torazawa et al. .......... 369/53.2 |
| 6,515,948 B1 | * | 2/2003 | Sakamoto ................ 369/47.32 |
| 6,538,965 B2 | * | 3/2003 | Mochizuki et al. ...... 369/47.22 |
| 6,628,575 B1 | * | 9/2003 | Ikeda et al. .............. 369/30.12 |
| 6,664,526 B2 | * | 12/2003 | Yokoi ...................... 250/201.5 |
| 6,678,227 B1 | * | 1/2004 | Kondo et al. ............. 369/47.33 |
| 6,690,629 B1 | * | 2/2004 | Hayashi ................... 369/44.29 |
| 6,751,174 B1 | * | 6/2004 | Takahashi ................ 369/47.37 |
| 6,791,918 B1 | * | 9/2004 | Tanishima ................. 369/47.1 |
| 6,804,183 B2 | * | 10/2004 | Ikeda et al. .............. 369/53.37 |
| 2002/0044507 A1 | * | 4/2002 | Hagiwara et al. .......... 369/47.4 |

FOREIGN PATENT DOCUMENTS

| | | | | |
|---|---|---|---|---|
| JP | 6-131814 | * | 5/1994 | ................ 369/47.3 |
| JP | 10-283724 | | 10/1998 | |
| JP | 2001-176193 | * | 6/2001 | ................ 369/47.3 |

OTHER PUBLICATIONS

Optical Disk Device (JP, 2000-048,484), Omokawa Mitsunori, Abstract, claims and the drawings.*

* cited by examiner

*Primary Examiner*—Tan Dinh
(74) *Attorney, Agent, or Firm*—Christensen O'Connor Johnson Kindness PLLC

(57) ABSTRACT

An optical disk device for recording data in an optical disk under ZCLV control is provided. The optical disk device divides the optical disk into a plurality of zones, and drives said optical disk at a linear velocity fixed in each zone but varied among the zones. At least one of the linear velocity and the number of zones of the optical disk is controlled in accordance with the amount of data to be recorded. Data recording time is reduced by dynamically changing at least one of the linear velocity and the number of zones of the optical disk in accordance with the amount of data to be recorded, rather than fixing the number of zones and the linear velocity thereof.

4 Claims, 4 Drawing Sheets

OPTICAL DISK DEVICE CAPABLE OF RECORDING INFORMATION DATA ACCORDING TO ZCLV FORMAT

BACKGROUND OF THE INVENTION

1. Field of the Invention

The present invention relates to an optical disk device, and more particularly to data recording in a ZCLV method in which an optical disk is divided into a plurality of zones in a radial direction and each zone is subjected to CLV (constant linear velocity) control.

2. Description of the Related Art

In optical disk devices, several control methods are employed, such as CLV (constant linear velocity) control, CAV (constant angular velocity) control, and ZCLV control in which an optical disk is divided into a plurality of zones and each zone is controlled at a constant linear velocity which varies among the zones. Although the CLV control method is now the most common employed for recording data on an optical disk because improvement in recording quality is relatively easy to achieve with this method, enhancement in recording speed under the CLV control is hampered by the upper limit of the rate of revolution at the innermost periphery of the disk. More specifically, under the CLV control the revolution speed is highest at the innermost periphery, and the upper limit of the rate of revolution imposed by electric or mechanic restriction at the innermost periphery determines the linear velocity in the CLV method.

According to the ZCLV technique, in order to maximize the recording speed, the linear velocity is varied for each zone, rather than fixed throughout the disk. For example, even though the linear velocity of 16 times faster than the normal velocity (hereinafter referred to as "16×") is the upper limit for the innermost zone, the linear velocities of 20× and 24× can be obtained at the middle and outer zones, respectively, with the same revolution speed. Therefore, an optical disk is divided into three zones, an inner, middle, and outer zone, for recording data at 16×, 20×, and 24× velocities, respectively.

However, the number of zones and the linear velocities are fixed in the ZCLV control system, and little consideration has been given on optimization of the number of zones and the linear velocity for each zone.

In an example wherein an optical disk is divided into two zones, i.e. inner and outer peripheral zones, and that the upper limit of the rate of revolution at the innermost periphery of the disk is 16×, when the linear velocity of a zone 1 on the inner peripheral side is set at 16×, and that of a zone 2 on the outer peripheral side is set at 32×, the disk position where the 32× linear velocity can be obtained with the rate of revolution of 16× corresponds to approximately 51 minutes. Therefore, when the amount of data to be recorded is smaller than 51 minutes, all data is recorded at 16×. When the amount of data to be recorded is 79 minutes, data for 51 minutes is recorded at 16×, and the remaining data for 28 minutes is recorded at 32×. The time required to record the data is:

recording time at 16×—3 minutes and 11 seconds
recording time at 32×—53 seconds
total—4 minutes and 4 seconds On the other hand, when the linear velocity of the outer peripheral zone 2 is changed from 32× to 24× for recording the same data of 79 minutes, the disk position where the 24× linear velocity can be obtained with the rate of revolution of 16× corresponds to approximately 21 minutes. Consequently, data for 21 minutes is recorded at 16× while the remaining data for 58 minutes is recorded at 24×. As a result, the time required for recording the data is as follows:

recording time at 16×—1 minute and 19 seconds
recording time at 24×—2 minutes and 25 seconds
total—3 minutes and 44 seconds Comparing the time periods in these two examples, it can be appreciated that the total recording time is reduced by approximately 20 seconds by changing the linear velocity in the outer peripheral zone from 32× to 24×. Thus, the recording time period varies with the linear velocity for each zone, and with the number of divided zones. The recording time cannot be reduced simply by increasing the linear velocity for each zone, or by increasing the number of divided zones.

SUMMARY OF INVENTION

The present invention aims to provide an optical disk device capable of recording data in a shorter time by employing the ZCLV control system.

An optical disk device according to the present invention comprises means for dividing an optical disk into a plurality of zones and driving said optical disk at a linear velocity fixed in each zone but varied among said zones, means for irradiating said optical disk with a laser to record data, and means for controlling at least one of the linear velocity and the number of zones of said optical disk in accordance with an amount of data to be recorded. Data recording time is reduced by dynamically changing at least one of the linear velocity and the number of zones of the optical disk in accordance with the amount of data to be recorded, rather than fixing the number of zones and the linear velocity thereof. The present invention can be implemented in several manners. According to one aspect, a technique for optimizing the linear velocity for each zone with the number of zones fixed to two or more is implemented. According to another aspect, a technique for optimizing the number of zones while fixing the linear velocity is implemented. According to a further aspect, a technique for optimizing both the number of zones and the linear velocity is implemented.

According to one embodiment of the present invention, the total recording time is calculated for virtual cases where data is recorded with various numbers of zones and linear velocities. A combination of the number of zones and the linear velocity that minimizes the total recording time is selected, and data is actually recorded at the selected number of zones and linear velocity.

While the present invention can be more clearly understood from the following description of the embodiments, the scope of invention is not limited to the following embodiments.

DESCRIPTION OF PREFERRED EMBODIMENT

A preferred embodiment of the present invention will next be described with reference to the accompanying drawings.

Figure 1:
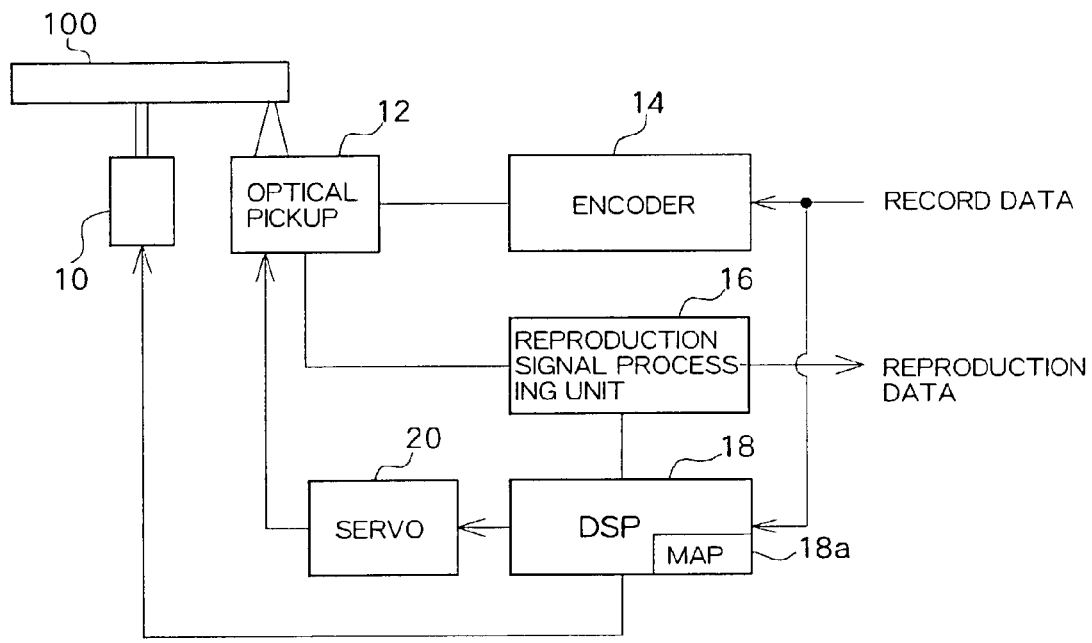
FIG. 1 illustrates a block diagram showing a configuration of an optical disk device.

FIG. 1 is a block diagram showing a configuration of an optical disk device according to the present embodiment. An optical disk 100 is rotationally driven by a spindle motor 10. The spindle motor 10 controls the optical disk 100 in accordance with the ZCLV method based on a control signal from a DSP 18, as will be described later. In other words, the optical disk 100 is virtually divided into a plurality of zones, and controlled so that the linear velocity is constant for each zone. The number of zones and the linear velocity for each zone of the optical disk 100 is dynamically set by the DSP 18 in accordance with the amount of data to be recorded.

An optical pickup 12 includes a laser diode (LD) and a focus/tracking actuator for emitting a laser of a recording power to produce a pit for data recording, and a laser of a reproducing power to supply the reflected beam modulated at the pit as an electric signal. The beam of laser light from the LD is divided into three beams (a main beam and two sub beams) by a diffraction grating before emitted. The data to be recorded is encoded by an encoder 14, and supplied to the optical pickup 12. A reproduction RF signal from the optical pickup 12 is supplied to a reproduction signal processing unit 16.

The reproduction signal processing unit 16, including an amplifier, an equalizer, a binarizer, a PLL, and a decoder, demodulates data from the reproduction RF signal, and supplies it as reproduction data. The unit 16 also produces a focus error signal and a tracking error signal from the reproduction RF signal, and supplies these signals to the DSP 18. The methods of producing the focus error signal and the tracking error signal, although publicly known, will be briefly described below. The focus error signal is produced by a difference between signals supplied from detectors located diagonally from quadrant detectors. When a push-pull signal of the main beam (difference signal derived from signals supplied from detectors dividedly disposed in the radial direction of the disk) is referred to as TEM and the push-pull signals of the sub beams as TES1 and TES2, a tracking error signal TE is known from the equation TE=TEM−(TES1+TES2)/2.

The DSP 18 supplies a control signal to a servo unit 20 based on the focus error signal and the tracking error signal received from the reproduction signal processing unit 16. The servo unit 20 drives the focus actuator and the tracking actuator so as to eliminate the focus error and the tracking error based on the control signal. The DSP 18 acquires data to be recorded, especially information on the data amount, and determines the number "n" of zones and the linear velocity Vn for each zone in accordance with the amount of data to be recorded, thereby driving the spindle motor 10.

Figure 2:
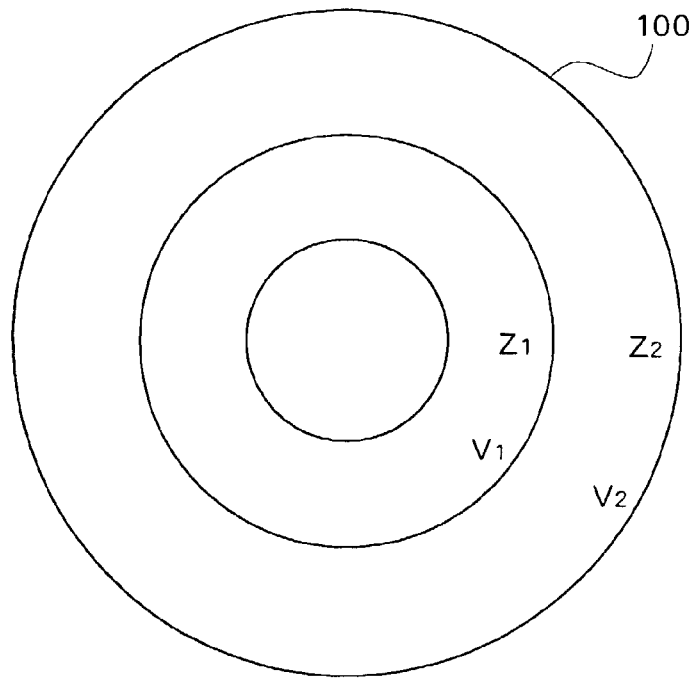
FIG. 2 is a view for explaining division of an optical disk into several zones.

FIG. 2 shows an exemplary configuration wherein the optical disk 100 is divided into two zones in the radial direction. The linear velocity of an inner peripheral zone Z1 will be referred to as V1 and that of an outer peripheral zone Z2 as V2. The linear velocity V1 in the innermost peripheral zone Z1 is determined by the allowable rate of revolution of the optical disk device, and the linear velocity V2 in the zone Z2 is determined so as to minimize the total recording time.

The manner of setting the number n of zones and the linear velocity Vn in the DSP 18 will next be described in detail.

Figure 3:
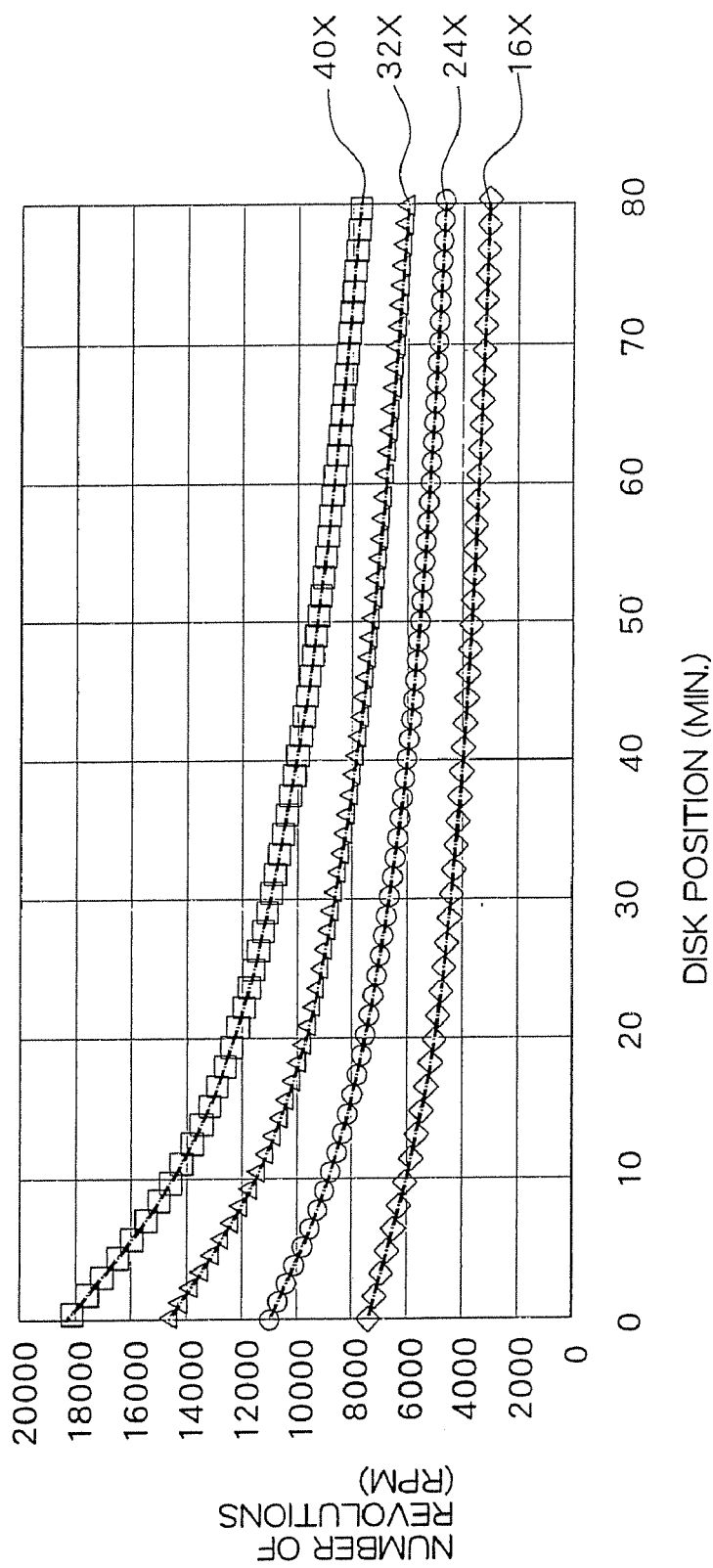
FIG. 3 is a graph showing a relationship between a disk position and the rate of revolution under the CLV control.

FIG. 3 shows the relationship between the disk position (minutes) and the rate of revolution under CLV control. In this graph, at 16× velocity, for example, the rate of revolution is approximately 7000 rpm (7333 rpm) in the innermost periphery, and the rate of revolution decreases as the position moves toward the outer periphery. The rate of revolution is approximately 3000 rpm at the 80 minute position. It can be appreciated from this graph that the rate of revolution in the innermost periphery at 16× velocity, i.e. 7333 rpm, corresponds to the disk position of approximately 21 minutes, 51 minutes, and 80 minutes at 24×, 32×, and 40×, respectively. This means that, when the velocity V1 shown in FIG. 2 is 16× and the velocity V2 is the linear velocity significantly exceeding 16×, the region where data is recorded at the linear velocity V1 is increased by the corresponding value (the area of the zone Z1 is increased), resulting in an increase in recording time period.

On the other hand, when the linear velocity V2 is decreased to, for example, 20× to be close to the velocity V1, the region where data is recorded at the linear velocity V1 is reduced. However, data is recorded at 16× for a region of 0 to 10 minutes and at 20× for the remaining region, and the total recording time required for data of 79 minutes is as follows:

recording time at 16×—38 seconds
recording time at 20×—3 minutes and 27 seconds
total—3 minutes and 55 seconds Thus, the total recording time is increased compared with the earlier case where the velocity V2 is 24× (the total recording time in this case is 3 minutes 44 seconds as described above). This is because, while the region where data is recorded at the velocity V1, i.e. 16×, is reduced by decreasing the velocity V2 to 20×, the total recording time is lengthened because the velocity V2 of 20× is lower than the velocity of 24×.

Thus, excessively high or low velocity V2 results in an increase in recording time, and, therefore, an optimum linear velocity must be found.

The same applies to the number of zones. By way of example, when the optical disk is divided into two zones, Z1 and Z2, and the velocities V1 and V2 are 16× and 32×, respectively, the time required to record 79 minutes of data is 4 minutes and 4 seconds, as described above. On the other hand, when the disk is divided into three zones, Z1, Z2, and Z3, and the velocities V1, V2, and V3 are set as 16×, 24×, and 32×, respectively, the resulting recording time is as follows:

recording time at 16×—1 minute and 19 seconds
recording time at 24×—1 minute and 15 seconds
recording time at 32×—53 seconds
total recording time—3 minutes and 27 seconds Thus, the recording time is shortened compared to the example where the disk is divided into two zones, Z1 and Z2 because, as can be seen from FIG. 3, the rate of revolution of the optical disk can be maintained at a high value during recording by increasing the number of zones and setting the velocity for each zone to an appropriate value.

However, at the border between zones recording must be interrupted to increase the rate of revolution of the disk, and a seeking operation is required for placing the optical pickup 12 at the recording position to record data in the next zone. Increasing the number of zones causes such waiting periods to accumulate, in which is counterproductive to reducing recording time.

The DSP 18 sets the optimum number of zones and linear velocity through calculation based on the amount of data to be recorded and the waiting period, rather than simply increasing the number of zones or the linear velocity for each zone.

Figure 4:
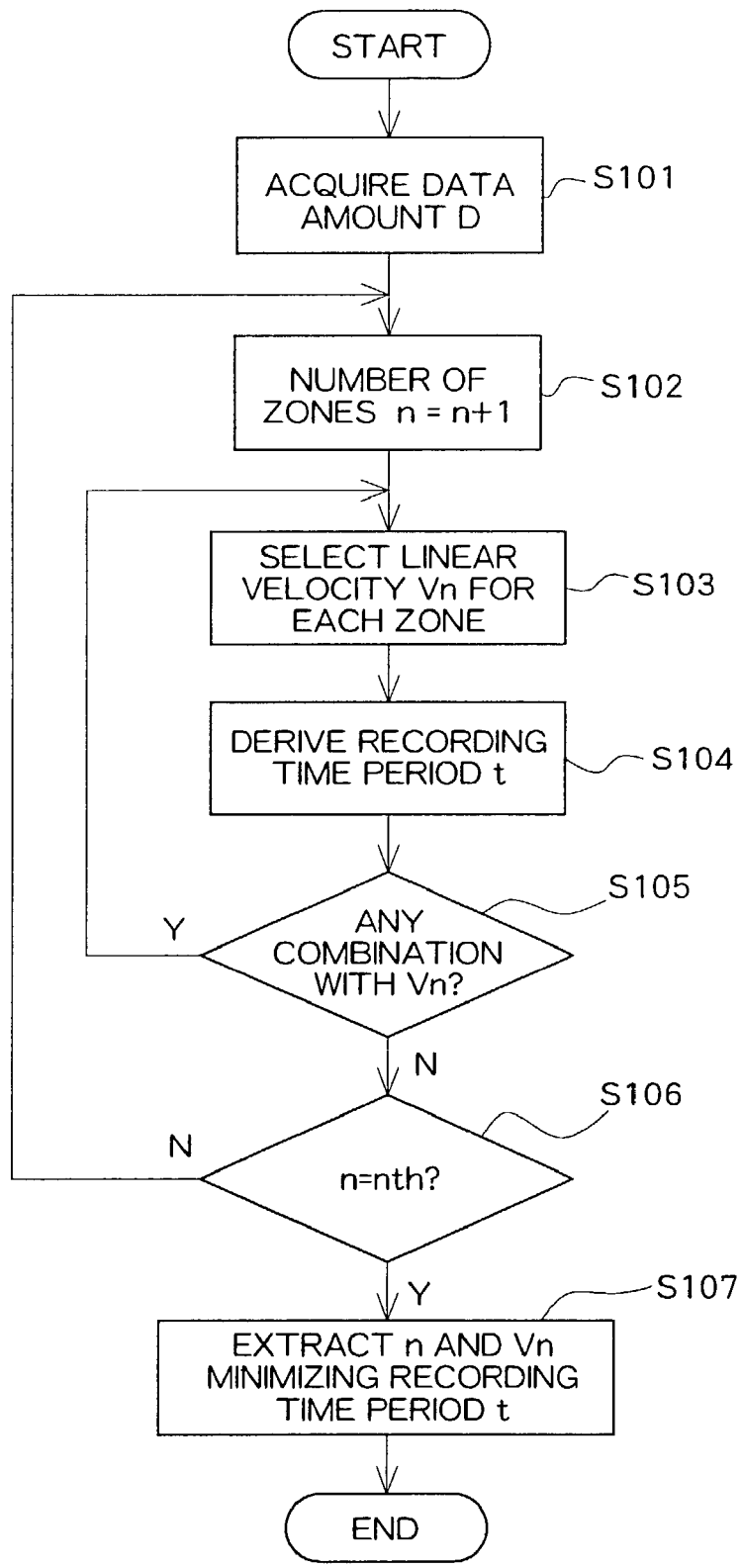
FIG. 4 is a flowchart of an embodiment of the present invention.

FIG. 4 is a flowchart of a process performed in the DSP 18. The DSP 18 first acquires an amount D of data to be recorded (S101), increments a parameter n (which is initially set as 1) of the number of zones (S102), and selects the linear velocity Vn for each zone (S103). It should be noted that the linear velocity of the innermost peripheral zone Z1 is determined by the upper limit of the number of revolutions, which is set as 16× in the present embodiment as an example. The linear velocities of the remaining zones Z2 and the like are selected from predetermined candidate velocities. By way of example, the velocities of 17×, 18×, 19×, 20×, . . . , 38×, and 40× are provided as the candidates, and the velocities of 16× and 17× are first selected for V1 and V2, respectively. After the number of zones and the linear velocity for each zone are selected, the recording time t is derived using these selected values (S104). The recording time t can be obtained from the following equation:

$$t=(n-1)WT+\Sigma\{Sn/(Vn \cdot Tp)\} \quad (1)$$

where WT represents a fixed time period for interrupting recording at the border between zones, Sn represents the area of the zone Zn, and Tp represents a fixed track pitch of, for example, 1.6 μm. Given the number n of zones and the linear velocity Vn for each zone, the value Sn can be uniquely determined, and the area of the outermost peripheral zone is determined by the data amount D. For example, when two zones are provided, the recording time t can be obtained as follows:

$$t=WT+S1/(V1 \cdot Tp)+S2/(V2 \cdot Tp) \quad (2)$$

The area S1 is determined by the velocities V1 and V2, and the area S2 is determined from the equation S2=D−S1. The derived recording time t is stored in a memory provided in the DSP 18 associated with the number n of zones and the linear velocity Vn, such as (the number of zones=2, V1=16×, V2=18×, the recording time=t).

After the recording time t is derived and stored in the memory, determination is made as to whether or not other combinations of the linear velocities are possible for the respective zones. When other combinations are possible (the velocities of 20×, 22×, . . . are possible for V2 other than 17×in the above example), the possible velocities are sequentially selected to similarly derive and store the recording time t in the memory. As a result, the recording time periods t with various linear velocities for two zones are stored in the memory.

After the recording time t is derived for every possible combination of the velocities V1 and V2, determination is made as to whether or not the number n of zones has reached a predetermined upper limit nth (such as 10) (S106). If it has not reached the limit, the process returns to the step S102, so that the number n of zones is incremented by 1 to 3, and the linear velocity Vn for each zone is selected to derive the recording time t. For example, the recording time t is derived with the linear velocities of 16×, 18×, and 20×, for V1, V2, and V3, respectively. After such a derivation of the recording time t, the period t is derived again for other combinations of linear velocities, such as V1=16×, V2=18×, and V3=32×.

By performing the above-described process, the recording time periods t with the varied linear velocities Vn are derived for the number of zones n=2, 3, 4, . . . , nth. The DSP 18 then extracts the combination of the number n of zones and the linear velocity Vn that minimizes the recording time t (S107). Obviously, it is also possible to derive the minimum recording time for each number n of zones and compare the minimum recording time periods for the respective numbers n of zones to select the number of zones minimizing the recording time period. More specifically, this process is performed as follows.

Figure 5:
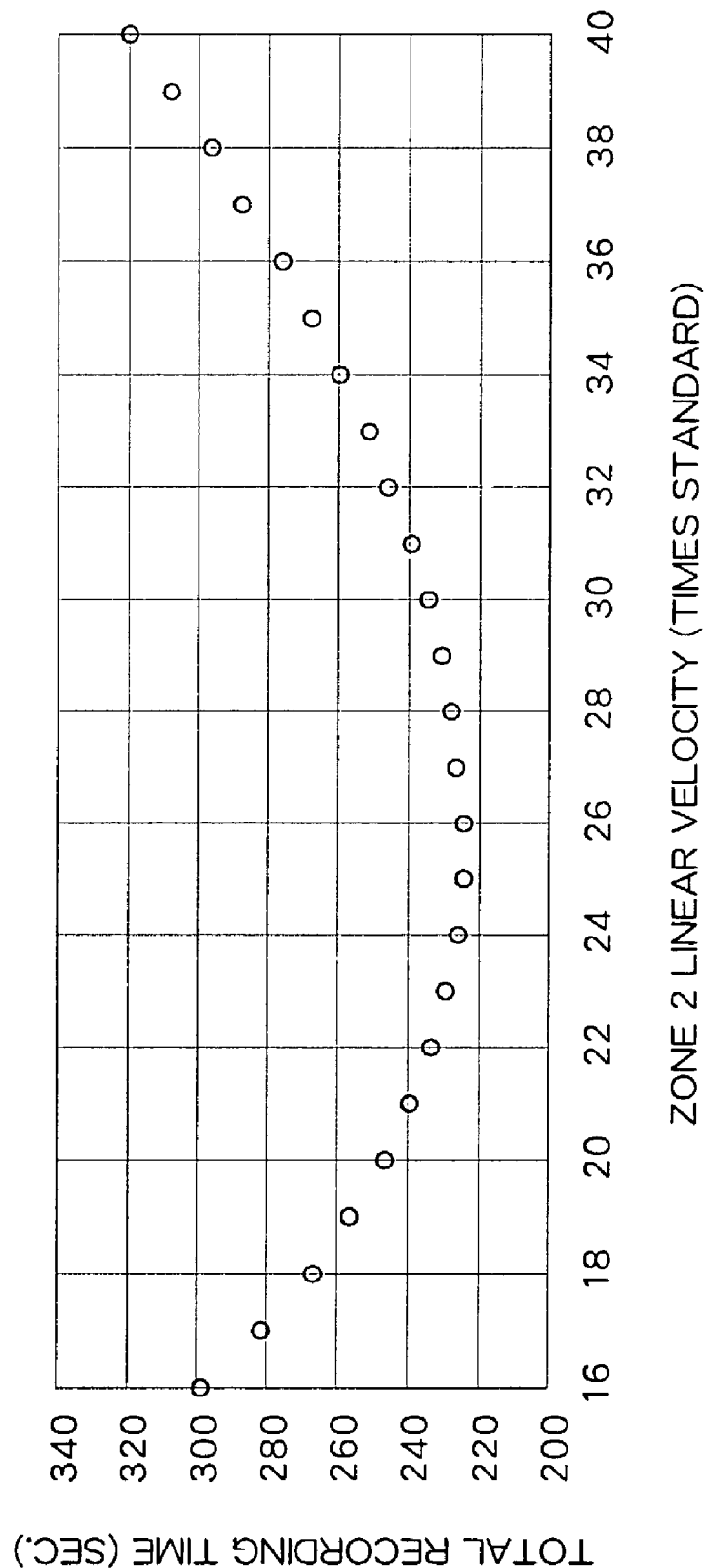
FIG. 5 is a graph showing a relationship between a recording time and a linear velocity in zone 2 for a disk is divided into two zones.

FIG. 5 illustrates a change in recording time t when the velocity V2 is varied as 17×, 18×, 19×, . . . , 40× under the conditions of: the number n of zones=2, V1=16×, the amount D of data to be recorded=79 minutes, the track pitch TP=1.6 μm, the record starting position=the radius of 25 mm, and the record interruption time WT=2 seconds. In the graph, the horizontal axis represents the velocity V2, and the vertical axis represents the total recording time (in seconds). With the increasing velocity V2, the recording time is decreased, and minimized when the velocity V2 is 26×. Thereafter, the recording time starts to increase with an increase in the velocity V2. The minimum recording time is 224.64 seconds.

The minimum values similarly obtained for the numbers of zones equal to 3, 4, 5, 6, 7, and 8, are shown in the table below.

| Number of Zones | Linear Velocity (Times The Normal) | Recording Time Period |
|---|---|---|
| 2 | $V_1 = 16, V_2 = 26$ | 224.64 |
| 3 | $V_1 = 16, V_2 = 22$ $V_3 = 29$ | 208.61 |
| 4 | $V_1 = 16, V_2 = 21$ $V_3 = 26, V_4 = 32$ | 202.61 |
| 5 | $V_1 = 16, V_2 = 19$ $V_3 = 23, V_4 = 27$ $V_5 = 32$ | 200.17 |
| 6 | $V_1 = 16, V_2 = 19$ $V_3 = 22, V_4 = 25$ $V_5 = 28, V_6 = 32$ | 199.58 |
| 7 | $V_1 = 16, V_2 = 18$ $V_3 = 20, V_4 = 23$ $V_5 = 26, V_6 = 29$ $V_7 = 32$ | 199.95 |
| 8 | $V_1 = 16, V_2 = 18$ $V_3 = 20, V_4 = 22$ $V_5 = 24, V_6 = 26$ $V_7 = 29, V_8 = 32$ | 200.78 |

It is understood from this table that the data D of 79 minutes can be recorded in the shortest time when the number of zones is 6 and the velocities are: V1=16×, V2=19×, V3=22×, V4=25×, V5=28×, and V6=32×.

For reproduction, the number of zones and linear velocity data for each zone upon recording stored in the memory of the DSP 18 may be used, or the recorded data may be reproduced under the CAV control in which the angular velocity is constant.

Thus, the recording time is simulated in the DSP 18 while varying the number of zones and the linear velocity to determine the number of zones and the linear velocity that minimize the recording time period, so that data can be efficiently recorded.

The parameters affecting the recording time in the present embodiment are as follows:

(a) amount of data to be recorded
(b) number of zones
(c) basic linear velocity of the optical disk
(d) record starting position
(e) record interruption time
(f) allowable rate of revolution of the disk
(g) track pitch of the optical disk.

Among the above, the parameters (c), (e), and (f) may be fixed.

While a preferred embodiment of the present invention has been described, the present invention is not limited to the example illustrating this particular embodiment, and can be modified in numerous manners.

For example, while the upper limit of the rate of revolution of the disk is 16× at the innermost periphery in the present embodiment, the disk can be rotated at any velocity allowable in the device.

Further, for additional data writing, data is not always recorded from the innermost peripheral zone (the radius of 25 mm) of the disk, and therefore the linear velocity V1 of the zone Z1 may be any velocity (24× or 32×) at that particular record starting position, instead of 16×. The number of zones and the linear velocities V2 and the like are set as described above.

Further, while in the present embodiment the amount D of data to be recorded is acquired and the recording time is derived from the combination of the number of zones and the linear velocity in the DSP 18 to extract the minimum from the derived recording time periods, such calculation may be performed in advance for each amount D of data to be recorded to store the data amount D, the number of zones and linear velocity that minimize the recording time as a map 18a, such as:

recording time D=60 minutes:
the number of zones A, V1=α, V2=β, V3=γ, . . .
recording time D=70 minutes:
the number of zones B, V1=h, V2=i, V3=j, . . .

As a result, the number of zones and the linear velocity for each zone can immediately be set by acquiring the amount D of data to be recorded.

Further, although the number of zones and the linear velocity that minimize the recording time are set in the present embodiment, a standard recording time period may be derived as a measure from the amount of data to be recorded, so that one combinations of the number of zones and the linear velocity resulting in shorter recording time period than the standard recording time period is selected. For example, the standard recording time period for the amount of data to be recorded may be set to 4 minutes, and one combination of the number of zones and the linear velocity that allows recording within 4 minutes may be selected to rotationally drive the spindle motor 10. For such selection, the upper limit of the linear velocity may be defined so as to select the combination with the linear velocity not greater than this upper limit.

Further, while the number of zones and the linear velocity are both set in accordance with the amount of data to be recorded in the present embodiment, the number of zones may be fixed to, for example, 2 or 3, to optimize only the linear velocity for each zone.

Also, in example of the present embodiment, a technique for setting the number of zones and the linear velocity for each zone to reduce the recording time period for the optical disk under the ZCLV control is employed as described above. According to the present embodiment, the number of zones and the linear velocity for each zone are not constant vary in accordance with the amount of data to be recorded. When the amount of data to be recorded is not known, data is recorded at a predetermined default number of zones and linear velocity. When the amount of data to be recorded is somehow given, the number of zones and the linear velocity are set in accordance with the data amount, which is compared with a threshold. When the amount does not exceed the threshold, data is recorded at the predetermined default number of zones and linear velocity. Otherwise, the number of zones and the linear velocity may be set in accordance with the data amount.

When only the number of zones is optimized with the linear velocity fixed for each zone, rather than optimizing both the number of zones and the linear velocity, the number of zones may be set as follows. Three linear velocities, 16×, 24×, and 32× are provided. When the data amount is small, the number of zones is set as 2 to record data at 16× in the zone Z1 and at 24× in the zone Z2. When the data amount is large, the number of zones is set as 3 to record data at 16× in the zone Z1, at 24× in the zone Z2, and at 32× in the zone Z3. For optimizing the linear velocity for each zone with the fixed number of zones, the velocities are set as follows. The number of zones is fixed to 3. When the data amount is small, the linear velocities of the respective zones are set as 16×, 19×, and 23×. When the data amount is large, the linear velocities of the respective zones are set as 16×, 25×, and 32×. Obviously, these values are given for illustrative purpose only, and combinations with other values are also possible. The present invention includes any technique for varying the number of zones and/or the linear velocity for each zone in accordance with the amount of data to be recorded.

Further, in checking the data amount in the DSP 18, when the amount of data can be estimated from data quality, i.e. when the type of data to be recorded is correlated with the data amount, the number of zones and/or the linear velocity for each zone may be varied in accordance with the type of data to be recorded. For example, when the data to be recorded is text data, the amount of data to be recorded can be determined as small, thereby recording the data in 2 zones. On the other hand, when the data to be recorded is audio, image, or motion picture data, the amount of data to be recorded can be determined as large, thereby recording the data in 3 zones. In the map 18a of the DSP 18, the optimum number of zones and linear velocity are prestored for each data type. Also in such a case, the parameter directly changing the number of zones and/or the linear velocity is the data type or data quality, to which the technique for changing the number of zones and/or the linear velocity in accordance with the amount of data to be recorded is applicable.

What is claimed is:

1. An optical disk device, comprising:
means for dividing an optical disk into a plurality of zones, and driving said optical disk at a linear velocity fixed in each zone but varied among said zones;
means for irradiating said optical disk with a laser to record data; and
means for controlling at least one of the linear velocity and the number of zones of said optical disk in accordance with an amount of data to be recorded, wherein said controlling means includes
means for storing in advance a combination of the number of zones and the linear velocity for each amount of data to be recorded, and
reading the combination of the number of zones and the linear velocity from said storing means in accordance with an acquired amount of data to be recorded.

2. An optical disk device according to claim 1, wherein said storing means stores in advance a combination of the number of zones and the linear velocity that minimizes the recording time period for each amount of data to be recorded.

3. An optical disk device, comprising:
means for dividing an optical disk into a plurality of zones, and driving said optical disk at a linear velocity fixed in each zone but varied among said zones;

means for irradiating said optical disk with a laser to record data; and means for controlling at least one of the linear velocity and the number of zones of said optical disk in accordance with an amount of data to be recorded, wherein said controlling means controls the number of zones and the linear velocity to default values when said amount of data to be recorded is equal to or smaller than a threshold, and, when said amount of data to be recorded exceeds the threshold, changes the number of zones and the linear velocity from the default values in accordance with said amount of data.

4. An optical disk device, comprising:

means for dividing an optical disk into a plurality of zones, and driving said optical disk at a linear velocity fixed in each zone but varied among said zones;

means for irradiating said optical disk with a laser to record data; and means for controlling at least one of the linear velocity and the number of zones of said optical disk in accordance with a type of data to be recorded, wherein said controlling means includes means for storing in advance a combination of the number of zones and the linear velocity for each type of data to be recorded, and means for reading the combination of the number of zones and the linear velocity from said storing means in accordance with an acquired type of data to be recorded.

* * * * *